United States Patent
Banavar et al.

(10) Patent No.: US 7,603,115 B2
(45) Date of Patent: Oct. 13, 2009

(54) SYSTEM AND METHOD FOR MAINTAINING COMMUNICATION CHANNELS THROUGH COVERAGE GAPS

(75) Inventors: Guruduth Somasekhara Banavar, Pelham Manor, NY (US); Maria Rene Ebling, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 650 days.

(21) Appl. No.: 11/078,112

(22) Filed: Mar. 11, 2005

(65) Prior Publication Data

US 2006/0205402 A1 Sep. 14, 2006

(51) Int. Cl.
*H04W 40/00* (2009.01)
(52) U.S. Cl. .................................. 455/421; 455/445
(58) Field of Classification Search .................. 455/421, 455/445
See application file for complete search history.

(56) References Cited

U.S. PATENT DOCUMENTS

| | | | |
|---|---|---|---|
| 6,009,374 A * | 12/1999 | Urahashi | 701/209 |
| 6,032,056 A * | 2/2000 | Reudink | 455/560 |
| 6,038,444 A * | 3/2000 | Schipper et al. | 455/421 |
| 6,343,216 B1 * | 1/2002 | Kim et al. | 455/450 |
| 6,597,906 B1 * | 7/2003 | Van Leeuwen et al. | 455/422.1 |
| 6,603,405 B2 * | 8/2003 | Smith | 340/905 |
| 6,721,572 B1 * | 4/2004 | Smith et al. | 455/456.1 |
| 7,181,224 B2 * | 2/2007 | Quirke et al. | 455/452.1 |
| 2005/0147212 A1 * | 7/2005 | Benco et al. | 379/84 |
| 2006/0183487 A1 * | 8/2006 | Allen et al. | 455/456.5 |

FOREIGN PATENT DOCUMENTS

JP 2001309448 A * 11/2001

OTHER PUBLICATIONS

Smith et al., Patent Abstracts of Japan (Electronic Translation) JP 2001-309448, Nov. 2, 2001.*

* cited by examiner

*Primary Examiner*—Vincent P Harper
*Assistant Examiner*—Marivelisse Santiago-Cordero
(74) *Attorney, Agent, or Firm*—Keusey, Tutunjian & Bitetto, P.C.; Anne V. Dougherty, Esq.

(57) ABSTRACT

A system and method for restoring communications through breaks in wireless coverage includes identifying a coverage gap in a wireless coverage area and notifying system users of the existence of the coverage gap. Connection information is distributed to other base stations to automatically reconnect parties upon exiting the coverage gap.

35 Claims, 5 Drawing Sheets

SYSTEM AND METHOD FOR MAINTAINING COMMUNICATION CHANNELS THROUGH COVERAGE GAPS

BACKGROUND

1. Technical Field

The present embodiments relate to the field of wireless communications, and more specifically, to a system and method for maintaining a communication channel between two or more communicating parties in the event that one or more of those parties moves into a low coverage or no coverage area for communication.

2. Description of the Related Art

Techniques for mobile communication are well known in the art. One technique is illustrated in FIG. 1. Referring FIG. 1, when a Party A wants to communicate with a Party B using a telephony system 100, Party A uses a telephony device 140 to initiate a call via their telecommunications provider 130. The telecommunications provider 130 communicates through a network 125 to a wireless telecommunications provider 120, which completes the call to device 110 used by Party B.

Referring to FIG. 2, wireless coverage provided by a wireless telecommunications provider is illustratively shown. A mobile party wanting to travel from point A 221 to point B 222 would have their telecommunications needs serviced by a series of four cells 211, 212, 213, and 214. Despite enjoying widespread wireless coverage as illustratively shown in coverage map 200 of FIG. 2, there still remain gaps in communication.

As illustrated in FIG. 2, a mobile party wishing to travel from point A 221 to point C 223 would experience a gap in service at both point D 224 and point F 226. As the mobile party traveling from point A 221 to point C 223 passed through point E 225, communication would degrade and would eventually be lost entirely as the mobile party reached point F 226. When the mobile party later reached point G 227, communication would again be possible.

These gaps in coverage are not likely to disappear for the foreseeable future. Depending upon the size of the gap, a user who moves into such an area may quickly move back into an area where communication is again possible (e.g., a mobile party passing through point D 224) or they may be unable to communicate for an extended period of time (e.g., a mobile party proceeding from point E 225 to point H 228 via point F 226).

For the parties attempting to carry on a conversation, it is, at best, inconvenient to be disconnected. At worst, the disconnection may cause greater issues other than merely ending the conversation prematurely (e.g., a call to a service center where the calling party would have to restart the call from the beginning or when the caller has been forwarded and does not know how to re-open the communication channel easily).

Existing telecommunications systems degrade the connection when the mobile party enters an area where coverage is weak and drop the connection when a user enters an area where there is no coverage. Degrading the connection and dropping the call can significantly disrupt the operation. There remains a need for telecommunications system to seamlessly handle areas where wireless coverage is weak or non-existent.

SUMMARY

A system and method for restoring communications through breaks in wireless coverage includes identifying a coverage gap in a wireless coverage area and notifying system users of the existence of the coverage gap. Connection information is distributed to other base stations to automatically reconnect parties upon exiting the coverage gap.

A method for communicating breaks in wireless coverage, includes identifying a coverage gap, in a wireless coverage area, and notifying system users entering the coverage gap.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

To maintain communications in spite of coverage gaps, systems and methods are disclosed for forwarding connection information to likely cell sites or "next towers", which are anticipated to be logically visited to continue the communication connection. In one embodiment, when the mobile party moves into a coverage gap, the mobile party's communication partner is informed of this fact and asked to hold. When the mobile party moves back into an area of coverage, the call continues.

It should be understood that the elements shown in the FIGS. may be implemented in various forms of hardware, software or combinations thereof. Preferably, these elements are implemented in a combination of hardware and software on one or more appropriately programmed general-purpose digital computers having a processor and memory and input/output interfaces. Moreover, in an embodiment, a program storage device readable by machine, tangibly embodying a program of instructions executable by the machine to perform method steps for restoring communications through breaks in wireless coverage may be provided.

It is also to be understood that while the illustrative embodiments will be described below in the context of a wireless telephony network, the present disclosure is not so limited. Rather, the exemplary embodiments are more generally applicable to any environment in which it would be desirable to provide techniques for maintaining connections despite connection degradation.

It is further to be understood that while the present embodiments assume that only one party of the communication is mobile, this should not be construed as limiting. For example, all parties in the communication could be mobile as well or combinations thereof are also contemplated. In addition, the communications may be between any number of parties.

Figure 1:
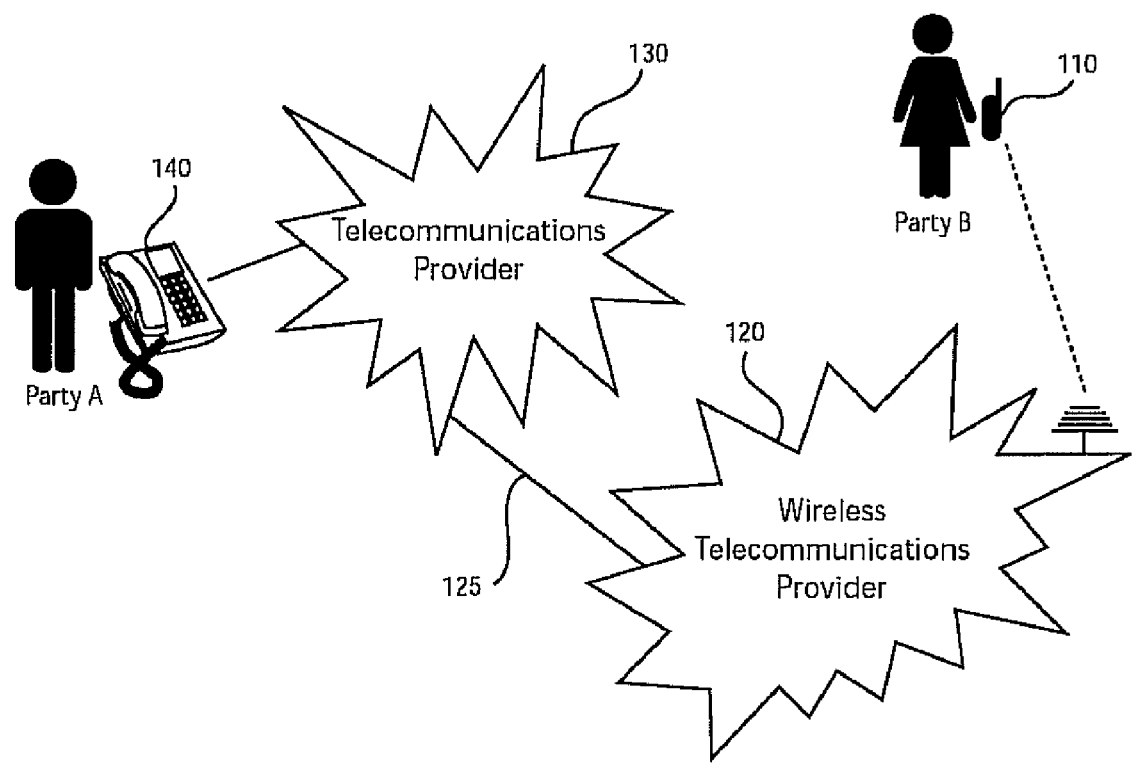
FIG. 1 is a diagram illustrating a wireless communications network.
Figure 2:
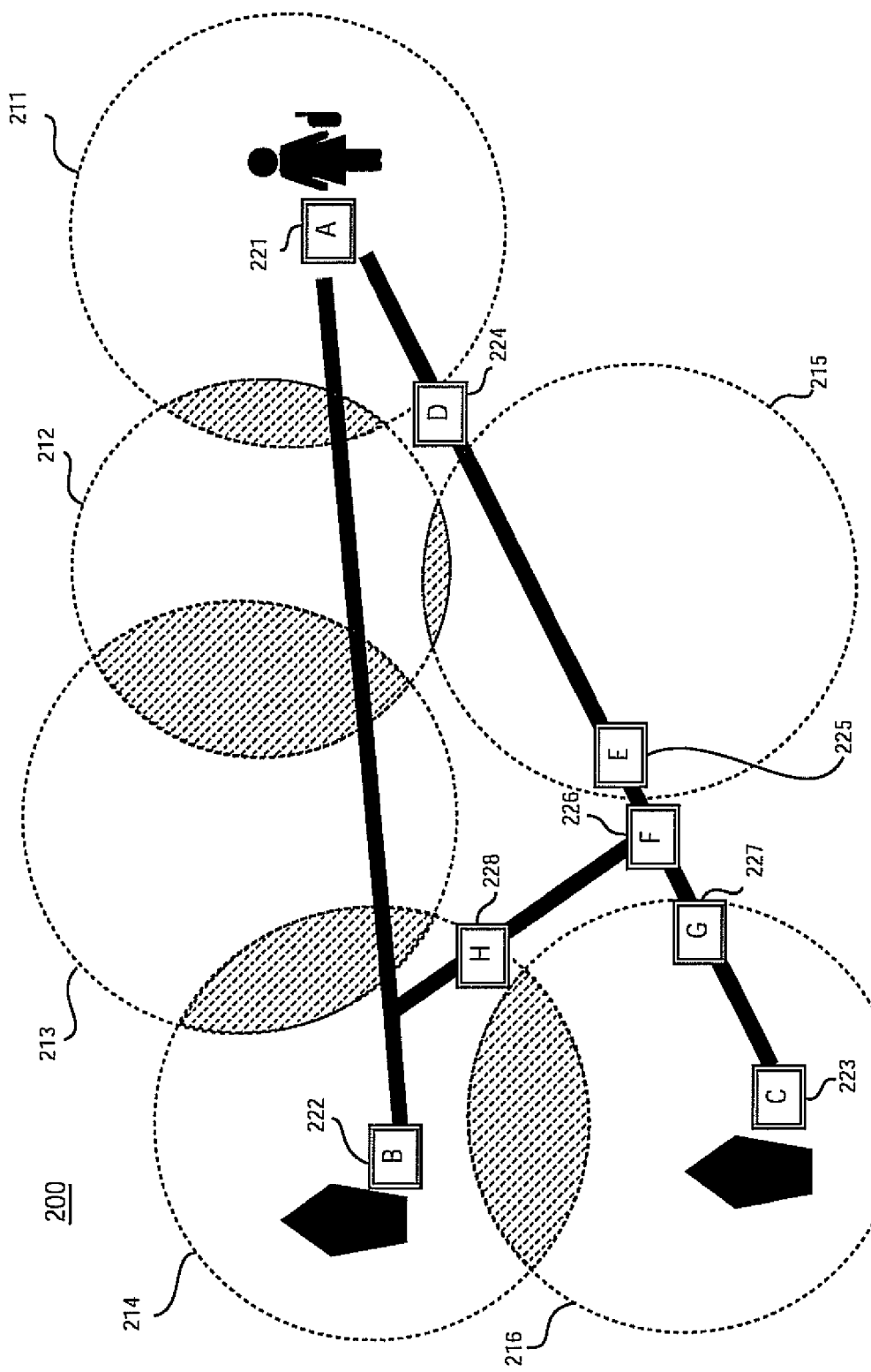
FIG. 2 is a diagram illustrating gaps in communications or coverage gaps in a wireless communications network.
Figure 3:
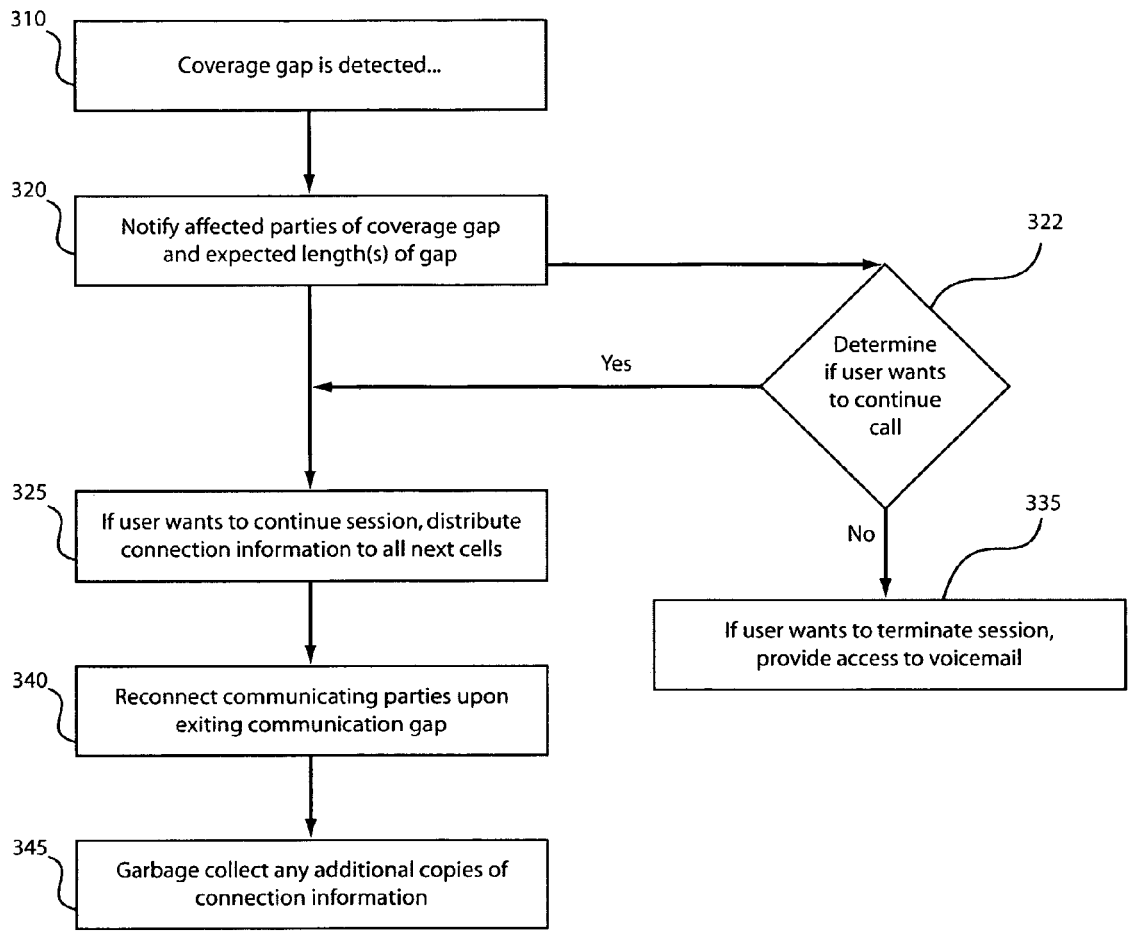
FIG. 3 is a block/flow diagram illustrating a system/method for maintaining communication when an unexpected coverage gap is encountered.

Referring now to the drawings in which like numerals represent the same or similar elements and initially to FIG. 3, a block/flow diagram illustratively depicts how communication can be maintained when a gap in coverage is detected in accordance with an exemplary embodiment. In block 310, a gap in coverage is detected. This may be achieved by measuring signal or power strength from local transmission/receiving stations. A gap in coverage may include an area of no coverage or an area where coverage is significantly reduced or below a threshold power/signal strength.

In one embodiment, the stations may include cell sites for one or more of the following networks: a cellular network, a wide area network (WAN), a local area network (LAN) or any other wireless communications network including a satellite network.

In block 320, the affected parties of the communication (e.g., parties on the telephone call) are notified of the problem and the expected length of the gap (or a range of possible gap lengths). This may include an audible signal, a voice message on the line or from the communication device, a displayed message on the telephone display, a flashing light or a combination of these or other warning signs/methods.

The expected length of the gap can be estimated in one or more of a plurality of ways. In one method, a calculation of an average length and average velocity of travel may be performed. This may be performed in advance and used in particular situations. For example, west bound or other directional information for travelers on a highway may be employed at a particular transmissions station to easily calculate the gap length given the speed of the mobile user since the location, direction and speed of the user will be known. In another embodiment, a global positioning system (GPS) may be used to calculate the gap time or length. Many cellular telephones and other mobile communication devices already employ GPS signal location systems. By providing a program or subroutine, gap times or lengths can easily be calculated and compared to a coverage map for wireless communication service to determine the gap information.

Another method for determining gap times or lengths may include instrumenting the communication system's infrastructure to record the time and station from which a cell phone loses coverage and the time and station to which the same cell phone reconnects to the network. If, after losing connectivity at a particular cell station or tower, cell phones reconnect to the network from more than one tower, then a range of gap lengths is possible. These gap lengths could be averaged or presented as a range.

In addition, statistical information may be gathered regarding when signals for a plurality of users are lost and regained between stations or towers. In this way, an estimate, can be determined based on a statistical average, and can be a function of time or day, weather conditions, system traffic and/or other factors. Many alternatives exist for estimating the gap length and this information could be presented to the affected parties in many different forms.

In block 322, a determination is made as to whether the user wants to continue the call. This may include prompting the user to select an option in real-time or the user may have preselected an option, or a factory default setting may be used. In block 335, if the affected party is unwilling to wait for the coverage to be restored, the affected party may be given access to voicemail of the other party, and the call is terminated in block 335, or the call may simply be terminated. In the case of data transmission/reception, the transmission/reception of data may be ceased until the reconnection can be made.

Alternatively, in block 325, if the affected party is willing to wait for the coverage to be restored, then the connection information is distributed to all possible "next" cells. A possible "next" cell may include any cell in which the mobile party might next obtain coverage. Often "next" cells will be the cells neighboring the last cell that had communications with the mobile party. When the mobile party returns to an area with communication coverage (presumably in a "next" cell), the communicating parties are reconnected in block 340 and their conversation may continue. Information distribution may include a signal or signals sent to a current tower prior to leaving a base station area or cell area vicinity The current tower can then distribute the information to "next" cells, base stations or towers, which will in turn be ready to reconnect the call when possible.

In addition, the "next" cell that received the mobile party alerts all other possible "next" cells to clean up the connection information state in block 345.

Figure 4:
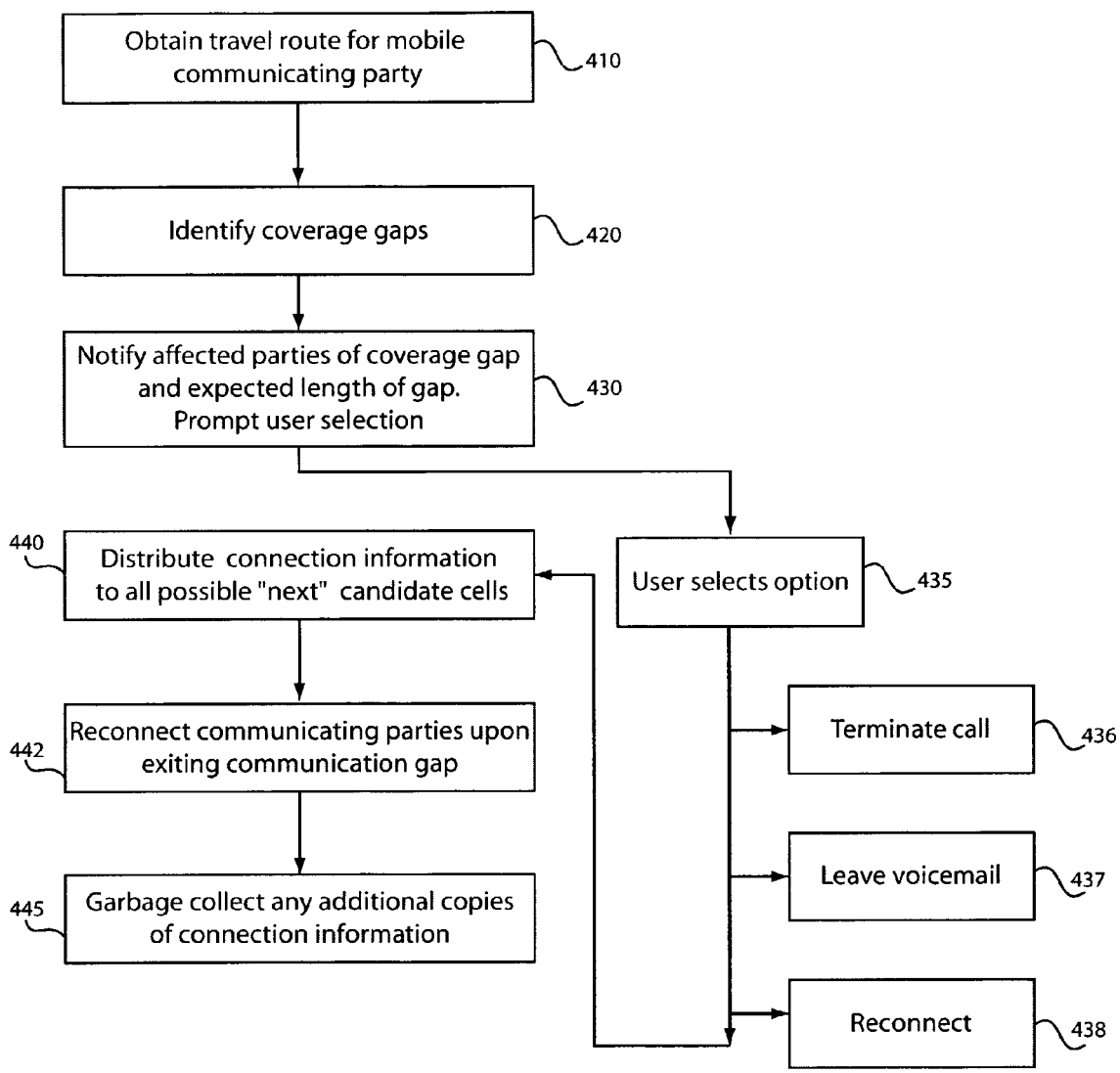
FIG. 4 is a block/flow diagram illustrating a system/method for maintaining communication during coverage gap when the coverage gap was predicted or known in advance.

Referring to FIG. 4, an alternative embodiment, a route of travel is obtained for the mobile party or parties in block 410. The route of travel can be obtained in many ways. In one example, the user can provide this information through a direct interface (e.g., providing the destination address) or through an indirect route (e.g., information shared from a mapping service such as MAPQUEST™). The system can then use all possible paths between the current location and the destination. In a more complex realization, the infrastructure can observe the mobile party's patterns of movement over time and make predictions about the current trip. In another more complex realization, the infrastructure can use all possible paths from the given point, or statistical probabilities based on the user's present location, direction, and speed.

From the route of travel, possible coverage gaps are predicted and/or identified by comparing a map of known roads to the service coverage maps in block 420. This information can be obtained either from the service provider or from third parties. As the mobile party approaches the expected coverage gap, all parties in the communication (e.g., parties on the telephone call) are informed of the impending coverage gap in block 430 and the expected length of the gap (or a range of possible gap lengths). All parties are given options in block 435 for how they would like to handle the communication gap. These options may include an audible signal, a voice message on the line or from the communication device, a displayed message on the telephone display, a flashing light or a combination of these or other warning signs/methods. The expected length of the gap can be estimated in one or more of a plurality of ways as described above.

In block 435, if the affected party is unwilling to wait for the coverage to be restored, the affected party may be given access to voicemail in block 437, terminate the call in block 436 or opt to reconnect in block 438. In the case of data transmission/reception, the transmission/reception of data may be ceased until the reconnection can be made.

In block 440, if the affected party is willing to wait for the coverage to be restored, then the connection information is distributed to all possible "next" cells. A possible "next" cell may include any cell in which the mobile party might next obtain coverage. When the mobile party returns to an area with communication coverage (presumably in a "next" cell), the communicating parties are reconnected in block 442 and their conversation may continue.

In addition, the "next" cell that received the mobile party alerts all other possible "next" cells to clean up the connection information state in block 445.

Figure 5:
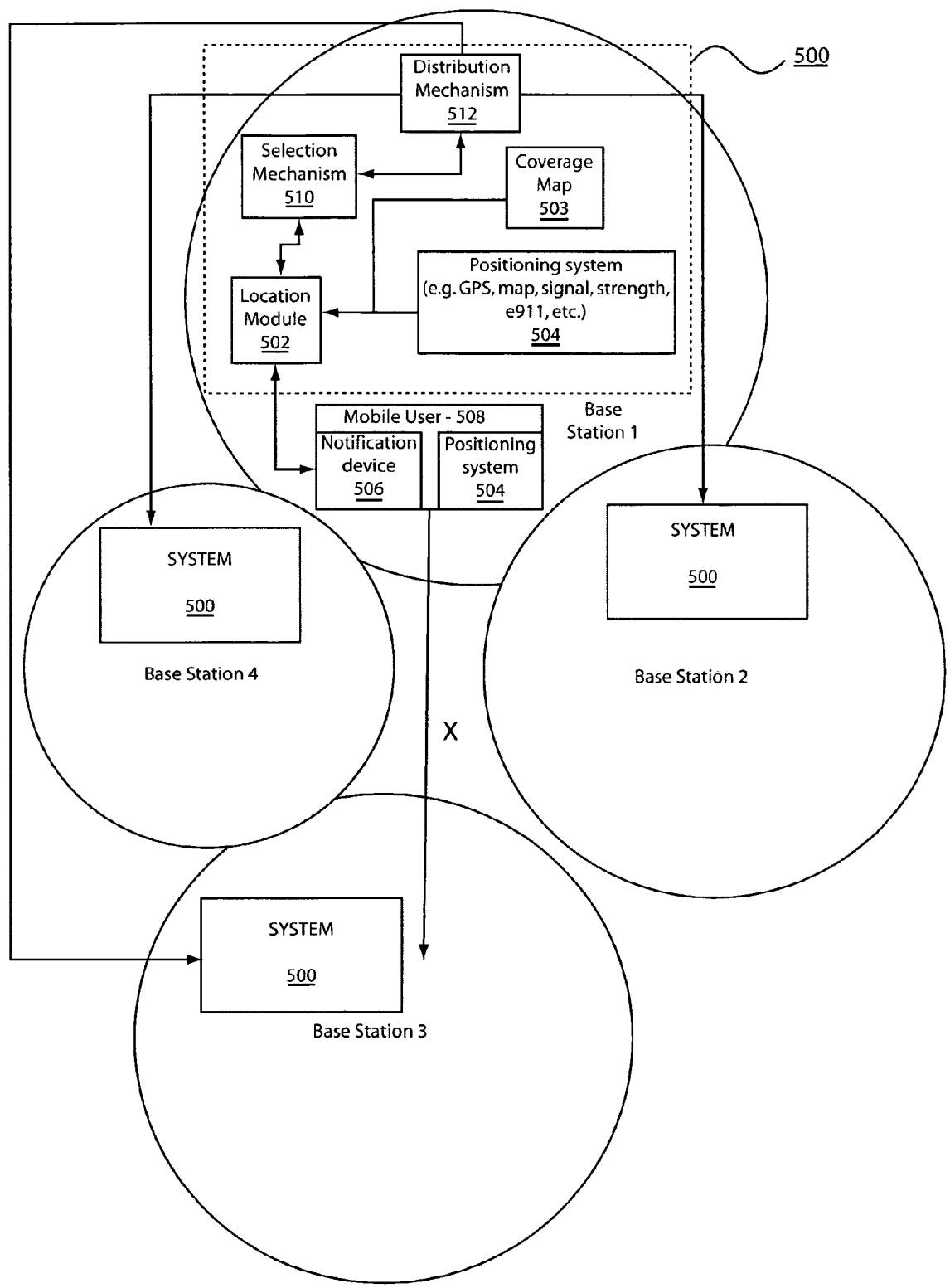
FIG. 5 is a block diagram illustrating a system for restoring communications through breaks in wireless coverage.

Referring to FIG. 5, a system 500 for restoring communications through breaks in wireless coverage includes hardware and software, which may be distributed over a portion or throughout a network. In one embodiment, the network includes a wireless telecommunications network, although other networks are also contemplated. It is to be understood that components of system 500 may also be distributed over the network or have all components located at each base station. For example, portions of the hardware or software may be located at different locations in the system or on mobile devices throughout the system. In one useful implementation, users may individually subscribe to a service that reconnects calls after a coverage gap (e.g., X in FIG. 5). The service may be a paid service or offered for promotional purposes.

System 500 includes a location module or system 502. Location module 502 preferably works with a positioning system 504 such as digital map information, e911, GPS or uses signal strength from one or more cell towers to determine a position of a user device (e.g., cell phone). Positioning system 504 may be located at the mobile user's device and/or on/at the base stations of the system. Location module 502 monitors the position of the user and compares this position against a coverage area map 503 to determine when a coverage gap is being approached. A warning may be triggered when the user is close to a coverage gap. When this occurs, the location module 502 provides notification that a coverage gap is approaching. This may take many forms and may include a notification device 506 which may be downloaded or otherwise provided on the user's device 508. The system may include a plurality of mobile devices, each mobile device including an alert mechanism to alert a user of an approaching coverage gap.

The location module 502 may include a program that determines a position of a user based on at least one of map information, global positioning satellite, signal strength, e911 (local emergency location) and distances between cell stations. The location module 502 preferably determines a coverage gap based upon a comparison between a coverage area map and a user's position. The location module 502 may further provide an estimation of gap length and/or gap travel time to the user.

A selection mechanism 510 may be provided which records a user option, prompts the user for a selection option and/or triggers an action upon entry into the coverage area gap. A user may select an action such as "reconnect the call upon exiting the gap X", "terminate the call" or "access the voicemail of the other party", etc. The system 500 may have a default action or a user may select a default action.

A distribution mechanism 512 determines candidate base stations or cells to distribute connection information to in the event that a call is to be reestablished after the coverage gap X has been traversed. The candidate cells are determined based on the speed, direction of motion and/or the proximity to the mobile user. Other criteria may also be employed. Distribution mechanism 512 preferably includes communication between base stations to convey the connection information needed to reestablish communication between users when after the coverage gap is traversed.

The distribution mechanism 512 preferably collects and disposes of additional copies or garbage copies of connection information in the candidate cells where the connection information was not used to reestablish the connection.

Having described preferred embodiments of a system and method for maintaining communication channels through coverage gaps (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for restoring communications through breaks in wireless coverage, comprising:
   identifying a coverage gap in a wireless coverage area;
   notifying system users of the existence of a coverage gap;
   requesting a callee from among the system users to hold during the coverage gap;
   offering the callee access to a voicemail of a caller from among the system users when the callee is unwilling to hold during the coverage gap; and
   reconnecting parties upon exiting the coverage gap;
   wherein the step of identifying a coverage gap includes:
   observing, by an infrastructure of a communication system to which the caller is subscribed, patterns of movement over time by the caller; and
   making predictions, by the infrastructure, of a route of travel of a current trip by the caller based on file observed patterns of movement over time;
   wherein the step of identifying a coverage gap further includes:
   recording a time and a base station from which a cell phone off the caller loses coverage;
   recording a time and a base station to which the cell phone of the caller resumes coverage;
   repeating said recording steps with respect to a plurality of different base stations;
   calculating a range of gap lengths based on the plurality of different base stations;
   averaging the gap lengths in the range of gap lengths; and
   specifying to the callee an average gap length based on a result of said averaging step.

2. The method as recited in claim 1, wherein the step of identifying a coverage gap includes calculating a gap length between coverage areas, wherein the gap length is calculated based on at least weather conditions.

3. The method as recited in claim 2, wherein the step of notifying includes notifying users of the gap length.

4. The method as recited in claim 1, wherein the step of notifying includes displaying information regarding the coverage gap on a display of a mobile communication device.

5. The method as recited in claim 1, wherein the step of notifying includes audibly rendering information regarding the coverage gap on a speaker of a mobile communication device.

6. The method as recited in claim 1, wherein the coverage gap includes a region where signal strength is below a threshold value.

7. The method as recited in claim 1, wherein the step of reconnecting includes distributing connection information to other base stations.

8. The method as recited in claim 7, wherein the step of distributing includes distributing the connection information to probable next base stations.

9. The method of claim 8, further comprising determining the probable next base stations based on speed, direction of motion and proximity to the caller.

10. The method as recited in claim 1, further comprising the step of collecting unused connection information from base stations for disposal.

11. The method as recited in claim 1, wherein the step of identifying a coverage gap in a wireless coverage area includes employing positioning information to detect a coverage gap.

12. The method as recited in claim 1, further comprising the step of providing user options for taking action while in the coverage gap.

13. The method of claim 1, wherein the step of identifying a coverage gap further includes receiving shared information regarding the route of travel of the current trip from a mapping service that is independent of the method.

14. The method of claim 1, wherein the step of identifying a coverage gap further includes repeating said recording steps with respect to a plurality of users, and wherein the step of calculating a range of gap lengths based on the plurality of different base stations is further based on the plurality of users.

15. A program storage device readable by machine, tangibly embodying a program of instructions executable by the machine to perform method steps for restoring communications through breaks in wireless coverage as recited in claim 1.

16. A method for restoring communications through breaks in wireless coverage, comprising:
    detecting a coverage gap in a wireless coverage area;
    notifying system users of the existence of the coverage gap prior to entering the coverage gap;
    prompting system users entering the coverage gap to select an option for handling a current communication in view of the coverage gap;
    distributing connection information to possible next cell stations; and
    automatically reconnecting the communication based on the connection information distributed to the next cell stations upon exiting the coverage gap,
    wherein the option includes requesting a callee from among the system users to hold during the coverage gap and offering the callee access to a voicemail of a caller from among the system users when the callee is unwilling to hold during the coverage gap; and
    wherein the step of detecting a coverage gap includes:
    observing, by an infrastructure of a communication system to which the caller is subscribed, patterns of movement over time by the caller; and
    making predictions, by the infrastructure, of a route of travel of a current trip by the caller based on file observed patterns of movement over time;
    wherein the step of detecting a coverage gap further includes:
    recording a time and a base station from which a cell phone off the caller loses coverage;
    recording a time and a base station to which the cell phone of the caller resumes coverage;
    repeating said recording steps with respect to a plurality of different base stations;
    calculating a range of gap lengths based on the plurality of different base stations;
    averaging the gap lengths in the range of gap lengths; and
    specifying to the callee an average gap length based on a result of said averaging step.

17. The method as recited in claim 16, wherein the step of detecting a coverage gap includes employing statistical data for predicting when a coverage gap is entered.

18. The method as recited in claim 16, wherein the step of detecting a coverage gap includes calculating a gap length between coverage areas, wherein the gap length is calculated based on at least weather conditions.

19. The method as recited in claim 18, wherein the step of notifying includes notifying users of the gap length.

20. The method as recited in claim 16, wherein the step of notifying includes visually displaying information regarding the coverage gap on a mobile communication device.

21. The method as recited in claim 16, wherein the step of notifying includes audibly rendering information regarding the coverage gap on a speaker of a mobile communication device.

22. The method as recited in claim 16, wherein the coverage gap includes a region where signal strength is below a threshold value.

23. The method as recited in claim 16, wherein the step of distributing includes distributing the connection information to adjacent base stations.

24. The method as recited in claim 16, further comprising the step of collecting unused connection information from base stations for disposal.

25. The method as recited in claim 16, wherein the step of detecting a coverage gap in a wireless coverage area includes employing positioning information to detect a coverage gap.

26. A program storage device readable by machine, tangibly embodying a program of instructions executable by the machine to perform method steps for restoring communications through breaks in wireless coverage as recited in claim 16.

27. A system for restoring communications through breaks in wireless coverage, comprising:
    a location module, which determines a position of a user relative to a coverage gap region and provides notification that a coverage gap is approaching;
    a selection mechanism, which records a user option and triggers an action upon notification of the existence office approaching coverage area gap;
    a distribution mechanism, which distributes connection information to candidate cells such that when the user exits the coverage gap communications interfered with by entering the coverage gap region are reestablished; and
    means for observing patterns of movement over time by the caller; and
    means for making predictions of a route of travel of a current trip by the caller based on the observed patterns of movement over time,
    means for recording a time and a base station from which a cell phone off the caller loses coverage;
    means for recording a time and a base station to which the cell phone of the caller resumes coverage;
    means for repeating said recording steps with respect to a plurality of different base stations;
    means for calculating a range of gap lengths based on the plurality of different base stations;
    means for averaging the gap lengths in the range of gap lengths; and
    means for specifying to the callee an average gap length based on a result of said averaging step;
    wherein the user option includes requesting a callee from among the system users to hold during file coverage gap and offering the callee access to a voicemail of the user when the callee is unwilling to hold during the coverage gap and
    wherein the means for observing and the means for making predictions are included in an infrastructure of a communication system to which the caller is subscribed.

28. The system as recited in claim 27, wherein the location module includes a program that determines a position of a user based on at least one of map information, global position satellite, signal strength, e911 and distances between cell stations.

29. The system as recited in claim 27, wherein the location module anticipates a coverage gap based upon a comparison between a coverage area map and a user's position.

30. The system as recited in claim 27, wherein the location module further provides an estimation of gap length or time based on at least weather conditions.

31. The system as recited in claim 27, wherein the system includes a plurality of mobile devices, each mobile device including an alert mechanism to alert a user of an approaching coverage gap.

32. The system as recited in claim 27, wherein the selection mechanism permits a user to select terminating a call upon entry into the coverage area gap.

33. The system as recited in claim 27, wherein the selection mechanism permits a user to select to reconnect a call upon exiting the coverage area gap.

34. The system as recited in claim 27, wherein the distribution mechanism collects additional copies of connection information in the candidate cells where the connection information was not used to reestablish the connection.

35. A method for communicating breaks in wireless coverage, comprising:
    identifying a coverage gap in a wireless coverage area;
    notifying system users of the existence of a coverage gap;
    requesting a callee from among the system users to hold during the coverage gap; and
    offering the callee access to a voicemail of a caller from among the system users when the callee is unwilling to hold during the coverage gap, and
wherein the step of identifying a coverage gap includes:
    observing, by an infrastructure of a communication system to which the caller is subscribed, patterns of movement over time by the caller; and
    making predictions, by the infrastructure, of a route of travel of a current trip by the caller based on the observed patterns of movement over time;
wherein the step of identifying a coverage gap further includes:
    recording a time and a base station from which a cell phone off the caller loses coverage;
    recording a time and a base station to which the cell phone of the caller resumes coverage;
    repeating said recording steps with respect to a plurality of different base stations;
    calculating a range of gap lengths based on the plurality of different base stations;
    averaging the gap lengths in the range of gap lengths; and
    specifying to the callee an average gap length based on a result of said averaging step.

* * * * *

UNITED STATES PATENT AND TRADEMARK OFFICE
CERTIFICATE OF CORRECTION

PATENT NO.        : 7,603,115 B2                                    Page 1 of 1
APPLICATION NO.  : 11/078112
DATED            : October 13, 2009
INVENTOR(S)      : Banavar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 804 days.

Signed and Sealed this

Fifth Day of October, 2010

David J. Kappos
*Director of the United States Patent and Trademark Office*